Jan. 6, 1970 L. J. LEE ET AL 3,488,699
METHOD AND APPARATUS FOR CONTINUOUSLY PREPARING DISPERSIONS
Filed Oct. 18, 1966
3 Sheets-Sheet 1

LOUIS J. LEE
JOHN B. THOMPSON
INVENTORS

BY
ATTORNEYS

Jan. 6, 1970  L. J. LEE ET AL  3,488,699

METHOD AND APPARATUS FOR CONTINUOUSLY PREPARING DISPERSIONS

Filed Oct. 18, 1966  3 Sheets-Sheet 3

LOUIS J. LEE
JOHN B. THOMPSON
INVENTORS

BY

ATTORNEYS

United States Patent Office 3,488,699
Patented Jan. 6, 1970

3,488,699
METHOD AND APPARATUS FOR CONTINUOUSLY PREPARING DISPERSIONS
Louis J. Lee and John B. Thompson, Rochester, N.Y., assignors to Eastman Kodak Company, Rochester, N.Y., a corporation of New Jersey
Continuation-in-part of application Ser. No. 507,454, Nov. 12, 1965. This application Oct. 18, 1966, Ser. No. 594,645
Int. Cl. B01f 15/00, 7/16
U.S. Cl. 259—2                                 9 Claims

ABSTRACT OF THE DISCLOSURE

Method and apparatus for preparing stable, uniform dispersions, on demand, utilizing means for variably regulating the ratio of the material to be dispersed and the carrier liquid and to regulate the temperatures of the materials to achieve a predetermined final dispersion temperature. The dispersion apparatus incorporates mixing means comprising a pair of meshing gear members disposed within a mixing chamber with the supply to the mixing chamber arranged to introduce the material tangentially of the gear members directly into the area of mesh.

---

The present application is a continuation-in-part of our application Ser. No. 507,454, filed Nov. 12, 1965, now abandoned.

The present invention is directed to the method and apparatus for continuously preparing a stable, smooth, uniform, dispersion of a molten material in a liquid carrier.

Specifically, for example, this invention relates to a process, method and apparatus for preparing aqueous emulsions or dispersions of glycerides as they are required and, if desired, in a continuous manner for use in a variety of food processes. More particularly, this invention relates to a procedure and the apparatus by which an active monodiglyceride and/or monoglyceride emulsion can be made available, more or less instantly upon demand and at varying glyceride concentrations, for use in those industries that have found a use for glyceride emulsions.

Likewise, the present invention provides a method and apparatus which can be used to continuously prepare a dispersion of various hydrocarbons and natural and synthetic waxes in water or other liquid in which they are immiscible.

In addition, the present invention can advantageously be used to continuously, or instantaneously, on demand, produce smooth, uniform and stable dispersions of many other materials, normally difficult or impossible to easily disperse, in a liquid carrier.

The problems in the food industry of rising costs and the constantly increasing difficulty of preserving an adequate profit margin have brought into sharp focus the necessity of using every means available for reducing production costs. These pressing reasons, among others, are why improved production methods in the form of automation are receiving major attention from the baking industry. Thus, various types of automatic devices have been built and are now in use for producing such products as macaroni, cereal, bread, foam mat dried foods and dehydrated potatoes, to name only a few. The bread-making machine is perhaps exemplary of these newly introduced automatic or continuous-mix systems since it employs a continuous fermentation and mixing process in place of the step-by-step procedures heretofore used. By the use of this automatic system, a loaf of bread can be produced at a substantial reduction in cost since the amount of equipment and labor involved have been reduced to a minimum.

However, even though costs must be cut whenever possible, the pressure of competition has also pointed up the need for improving the flavor, uniformity and appearance of the baked products. Although numerous methods and materials have been presented to the food industry for accomplishing these desired results, none have been more widely received than the use of selected types of additives. Of all the numerous additives that have been produced for use in food products, those of the so-called glyceride class, which include monoglycerides, diglycerides, and triglycerides in various combinations have proven to be among the more acceptable and widely used. These glycerides are particularly useful as emulsifying agents since they tend to emulsify air thereby providing fine grain and thin cell walls in baked products. Furthermore, monoglycerides of this type have the ability to complex starches thereby allowing the production of alimentary paste products which do not become pasty, sticky or slimy upon cooking and which are not overhydrated even after substantial overcooking or the like. They are also equally noted for their softening and antistaling effects.

The saturated edible glycerides that are most useful for the purposes named above are classified as monoesters of saturated higher fatty acids which are normally solid at room temperature and are normally produced by direct esterification of saturated fatty acids with glycerin. However, these saturated monoglycerides can also be prepared by the glycerolysis of chemically saturated vegetable and animal oil, that is, the interesterification of glycerin with chemically saturated triglycerides such as those provided by hydrogenated lard, beef tallow, soybean oil, cottonseed oil and the like. Other methods as set out, for example, in Bailey's Industrial Oil and Fat Products, third edition (Interscience Publishers, 1964), may also be used to produce the desired glycerides.

From both a cost and convenience standpoint it would be ideal if the monoglyceride or mono-diglyceride could be prepared in small or large increments at the moment they are needed and could thus be added in a truly continuous fashion, on demand, to the food product being produced by a continuous-mix or other type system. However, this has heretofore been impossible using prior known methods or techniques. Furthermore, as is well known, any aqueous additive of the glyceride type that is to be used in bread, for example, should normally produce a smooth, uniform dispersion when mixed with water. Unfortunately such a smooth uniform dispersion of mono-diglyceride in water cannot be made by stirring the components together and heating unless soap or some other co-emulsifier is present. In fact, a saturated mono-diglyceride assaying at from 40 to 60 percent monoglyceride, which is the percent range normally available, will produce a lumpy, curdled blend when the glyceride is heated and stirred with water in the manner normally followed in producing food products. Furthermore, this blend separates immediately when stirring is stopped. Therefore it is impossible to obtain uniform incorporation of aqueous mixtures of commercial mono-diglycerides by simple stirring methods or to use such glycerides in any continuous systems heretofore available to the baking industry.

It has been customary to avoid, as far as possible, the blending problems which result when mono-diglycerides are used in food products through the use of what has come to be known as "high purity monoglyceride." High purity monoglyceride is usually defined as monoglyceride compositions containing saturated monoglycerides at a concentration of at least 90 percent by weight. Such high purity monoglyceride is normally prepared by vapor or molecularly distilling the interesterfication reaction of a monoglyceride mixture produced when the glycerin and fat or oil are reacted together.

Distillation of high purity monoglyceride is usually effected by causing successive small increments of the interesterification reaction mixture to flow along an evaporation surface so that distillation of any given increment is completed in a relatively short period of time. It is desirable to employ high vacuum, substantially unobstructed path centrifugal distillation for effecting separation of the monoglyceride in relatively large quantities. The distillation is carried out at temperatures below about 225° C. and under conditions effective to molecularly distill the monoglyceride. The pressure employed must be effective to cause distillation of the desired partial ester from the film of distillate at the temperature employed. In most cases it is desirable to employ a vacuum below about 100 microns and preferably as low as 1 to 20 microns mercury.

The incorporation of these saturated monoglycerides into a baking dough that is being produced by a continuous-mix system has also proven to be rather difficult. The first approach to this incorporation problem involved preparing an aqueous emulsion by adding the monoglyceride with stirring to a tank or vat of water that was being maintained at a temperature of from 140° to 150° F. After a homogeneous dispersion was obtained by this slow mixing and stirring operation the dispersion was cooled, with continued stirring, to room temperature. If this carefully controlled stirring and cooling step is omitted then expensive and complicated homogenizers are necessary to reduce particle size and induce stability within the aqueous emulsion. However, even under ideal conditions the viscosity of the aqueous emulsion as it cools is such that the concentration of monoglyceride is limited to between 5 and 25 percent, with the remainder being water.

As will be apparent, this procedure of preparing and storing saturated monoglyceride until it is added to the dough mix as needed is cumbersome, requiring large tanks, heavy stirring and control equipment, and considerable time and labor. Furthermore, aqueous emulsions of saturated monoglycerides are most active from a baking standpoint immediately after they are mixed which, in the prior preparation procedure, is that period in which they are stored awaiting use. Since the alpha or most active phase of such a polymorphic substance is thermodynamically unstable, the saturated monoglyceride in this form reverts to the more stable beta phase in a relatively short period of time. Often the aqueous emulsions of saturated monoglyceride heretofore produced for commerce have gone from the desirable alpha phase to the less active beta phase before they have been used in a dough mix for either a continuous or a conventional bread making process.

In an effort to avoid certain of the disadvantages inherent in aqueous saturated monoglyceride emulsions heretofore produced for use in baked products, the baking industry has substituted ready-prepared emulsions (hydrates) or shortenings containing monoglyceride. Where ready-prepared hydrates are used a large proportion of the product is water which often must be shipped considerable distances. This obviously increases the cost of the finished baked product. On the other hand monoglyceride shortenings are undesirable since they can only be produced by "Votation" or adequate mixing of the emulsifier into the shortening. The latter procedure ties the emulsifier to the shortening and thereby greatly limits the activity and flexibility of the product.

To compound the disadvantages associated with the use of the ready-prepared hydrates or shortenings containing monoglyceride it has been found that the newer continuous-mix systems utilize a sequence of operation which requires that the hydrated products be added to the "brew" or "fat" tank while the shortenings must be added to the fat tank. The addition of the hydrated products to the brew produces a foaming problem and often the monoglyceride also "plates out" or precipitates and clogs the brew cooler. If added to the fat tank, good distribution of the hydrated products is a problem. The addition of votated shortening to the fat tank requires that the temperature of the tank be raised above the most desirable limit in order to melt the shortening mixtures.

From the foregoing it is readily apparent that development of a method and apparatus whereby an aqueous mixture of mono-diglyceride or monoglyceride could be continuously produced as needed and dispersed directly into a baking dough would respresent a very desirable and long sought solution to a number of perplexing problems. According to this invention a method has been found and an apparatus produced which permits monoglycerides and mono-diglycerides to be continuously produced on "demand" as an active emulsion or dispersion for use in food products. This method and apparatus is especially adapted for use with either conventional or continuous-mix systems since the emulsifier product is produced only when needed and then on a continuous basis thus alleviating the production, storage, shipment and use problems heretofore present in similar emulsifier hydrates.

In its most basic form the method and apparatus of this invention consists of continuously contacting the emulsifier and carrier liquid, such as water, with each other for a very brief period of time. Each ingredient, that is, the glycerides and water, must, however, first be heated to a precise condition necessary for producing the desired smooth, even emulsion, and the residence time as well as the proportion of the ingredients must be carefully regulated to give the necessary mixing zone environment.

Therefore, one object of this invention is to produce a glyceride emulsion or dispersion that can be used in food products.

Another object of this invention is to provide an inexpensive, highly active, glyceride emulsion that is especially adapted for use in food products.

Yet another object of this invention is to provide a method and apparatus whereby either a mono-diglyceride or monoglyceride emulsion or dispersion can be produced in a highly active form as needed, or on a continuous basis for incorporation in food products.

Yet still another object of this invention is to provide an apparatus for prodcing on a demand basis emulsions or dispersions that are active, stable and particularly adapted for use in continuous-mix food processing systems.

A further object of this invention is to provide a process for producing and applying, upon demand and in the quantity needed, a glyceride emulsion or dispersion to a food processing system.

A still further object of this invention is to provide a process and apparatus which permits either, or both, a monodiglyceride or high purity monoglyceride emulsion of various concentrations to be prepared and added on a demand basis, directly to a food processing system.

Another object of this invention is to provide a process and apparatus for instantly preparing and adding highly concentrated liquid glyceride emulsions, as needed, to a food processing system.

Moreover, the present invention provides a method and apparatus for continuously preparing nearly any dispersion of an immiscible material in a liquid carrier, which dispersion is smooth, uniform, and more stable than that heretofore possible.

These and other objects and advantages of this invention will be more apparent upon reference to the following description, appended claims and drawings wherein:

Figure 4:
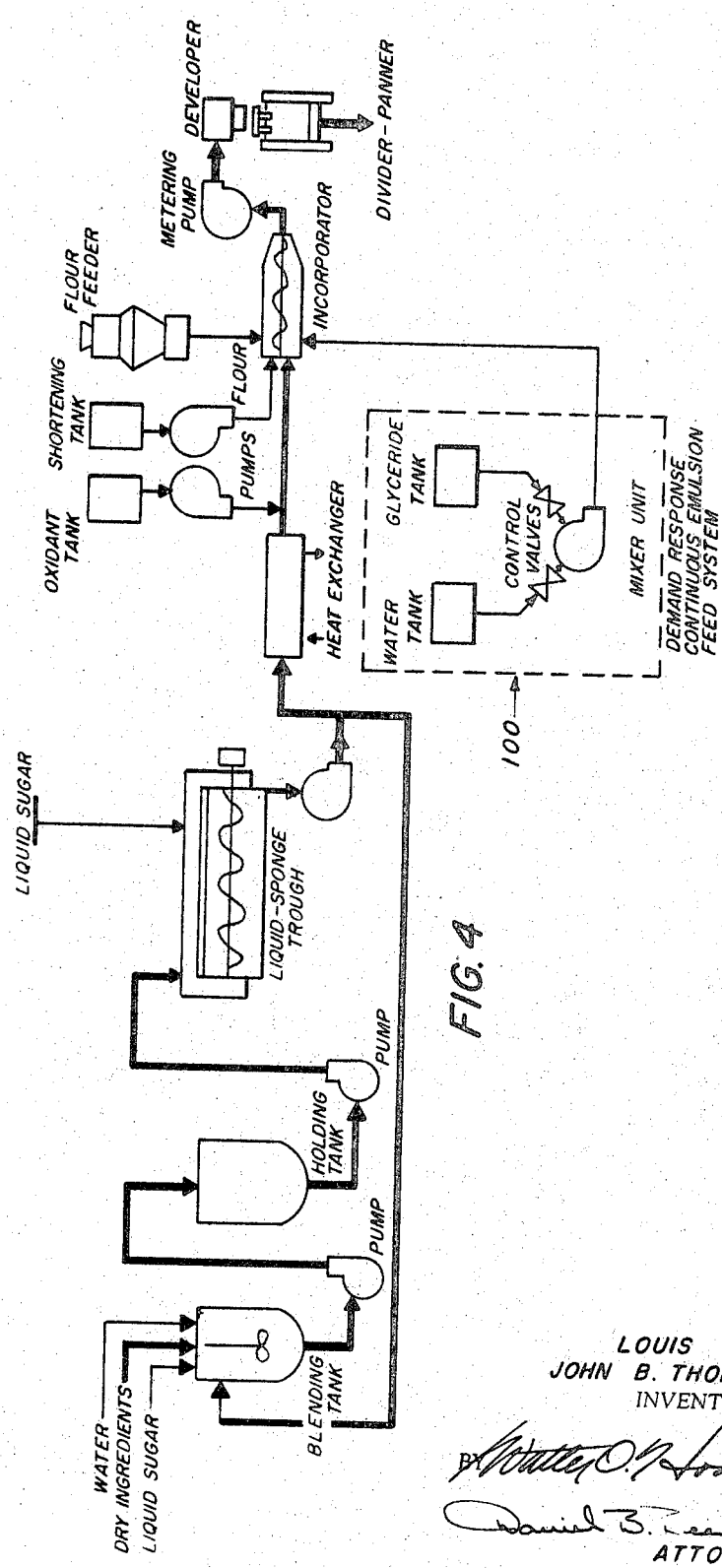
Figure 5:
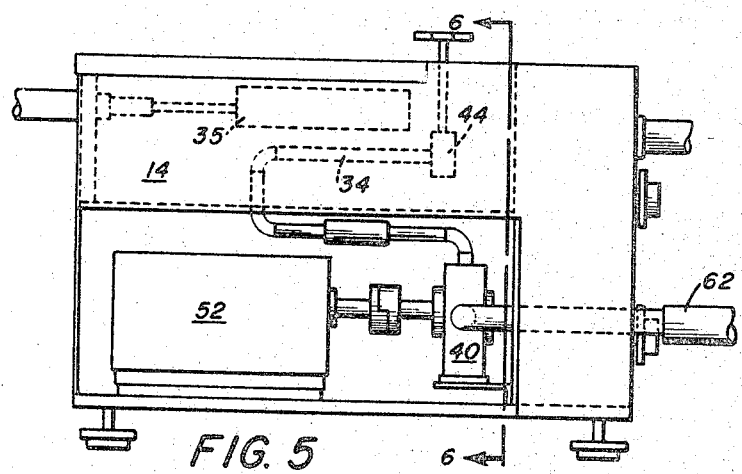
Figure 6:
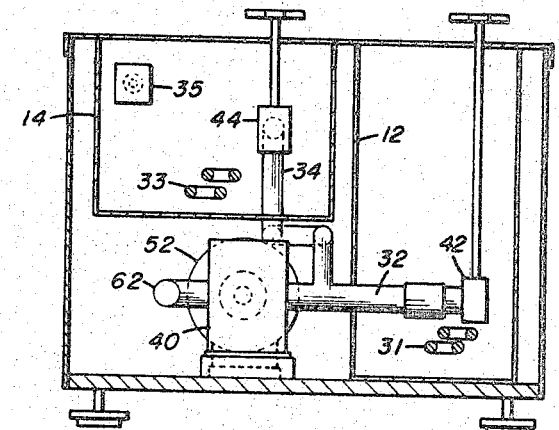

FIGURE 4 diagrammatically illustrates the demand response homogeneous glyceride emulsion supplying apparatus of this invention connected to a continuous-mix bread dough system;

FIGURE 5 illustrates a side view, partially in section of a specific embodiment of the present invention; and FIGURE 6 illustrates a section of a specific embodiment taken along line 6—6 of FIGURE 5.

As mentioned briefly hereinabove, the novel process which permits, for example, mono-diglyceride or monoglycerides to be formed into a usable emulsion on demand basis, and thus eliminates the "batch" processing steps heretofore thought necessary, consists basically of continuously contacting the glyceride and the carrier liquid with each other under carefully controlled conditions for a very brief period of time. Since water is one of the more common carrier liquids for various glycerides that are to be included into baked products, the invention will be described as it is to be used with water. It should be realized, however, that other carrier liquids such as milk, grape juice or other fruit juices, vegetable juices, etc. may be used if such is necessary or desirable. In any event each ingredient of the emulsion, that is, the mono-diglyceride or monoglyceride and the carrier liquid, must first be preheated to within a very close tolerance of a predetermined temperature prior to their being contacted together. If the ingredients are not heated to the temperature and combined under the conditions and in the manner to be more fully described hereinafter, then the desired emulsion cannot be produced.

The specific temperature of the glyceride as it is contacted with a carrier liquid, such as water, may vary over only a very limited range if the desired emulsion is to be obtained. This range has been found to be between the point where the mono-diglyceride and/or monoglyceride changes from a solid to a liquid phase and the temperature where the glyceride starts to decompose or smoke. Normally this temperature is between about 180° F. and 290° F. with the preferred temperature being about 200° F. However, regardless of what the temperature of the glyceride may be within the above specific range, the temperature of the carrier liquid (usually water) must be such that the final emulsion produced, when the ingredients are mixed together, is between 100° F. and 170° F. using distilled monoglycerides.

Using mono-diglyceride, with the water temperature at 115° F. and the melted mono-diglyceride at 200 F., a smooth, uniform dispersion can be made up to a concentration of around 65 percent. If the water temperature is raised to 130° F. to 135° F. and the temperature of the melted mono-diglyceride is maintained at 200° F., concentrations up to only around 25 percent are possible. When the water temperature is maintained at 130° F. and the melted mono-diglyceride is heated to 230° F., only a 12 percent concentration of usable dispersion can be made. Furthermore, no usable dispersion can be obtained where the water temperature is raised to 150° F. and the mono-diglyceride is heated to 210° F.

Thus it is seen that a critical range of temperatures exists and that usable dispersions can be obtained only when the temperature of the final emulsion is between about 100° F. and about 170° F. for distilled monoglyceride and about 130° F. to 170° F. for mono-dilglyceride. In view of the fact that the glyceride must be in a melted or fluid state and therefore at a temperature of about 200° F., the temperature of the water or other carrier liquid must be appreciably lower. The exact temperature of the carrier liquid necessary for obtaining a usable emulsion of either a mono-diglyceride or monoglyceride will, therefore, depend upon several factors; the principal ones being (1) the initial temperature of the glyceride being used, (2) the ratio of water-to-glyceride being employed in the dispersion, (3) the temperature dissipation of the container in which the ingredients are being mixed, and (4) the rate at which the ingredients are mixed.

In view of these considerations, which must be taken into account in producing a usable dispersion of mono-diglyceride or monoglyceride, it is extremely desirable, if not mandatory, that a very rapid mixing of the ingredients occur and that the residence time" of the ingredients in the mixer prior to their being placed directly into the food product be reduced to a minimum. Such a mixing can be obtained with certain types of "pump" mixers as well as with other known mixing devices. However, the pump mixer is preferred since it not only gives the desired rapid and complete mixing of the ingredients within a rather small "mixing zone", but also can be operated on a "demand" basis.

Figure 1:
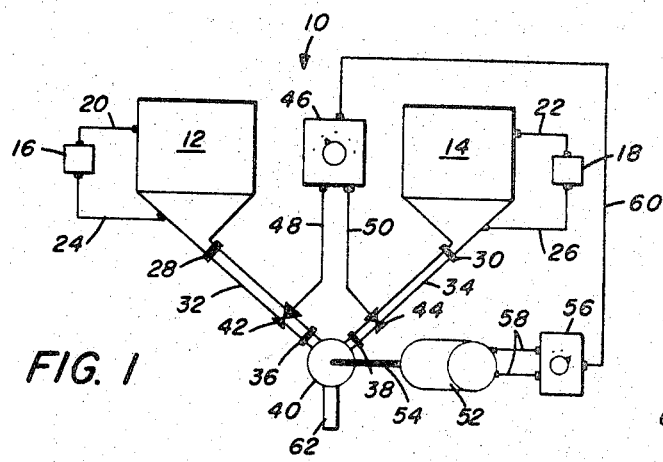
FIGURE 1 illustrates a typical installation designed in accordance with the present invention for the continuous, instantaneous preparation of a homogeneous glyceride emulsion.

With continued reference to the accompanying figures wherein like reference numerals designate similar parts throughout the various views, and with initial attention directed to FIGURE 1, reference numeral 10 is used to generally designate a demand response, continuous emulsion feed system constructed in accordance with one concept of the present invention. The two fluid containing tanks, one of which holds the mono-diglyceride and the other the carrier liquid, are designated at 12 and 14. The temperature of the contents in each tank is maintained at a predetermined level through the use of a temperature responsive or like control circuit. For purposes of illustration these circuits are shown in block form at 16 and 18. An electrical or other suitable conductor 20–22 is connected from a thermostatic type control element (not shown), which is normally mounted within each tank, to the input terminal of the control units. Each tank is provided with a variable heating element (not shown) which may be of the immersion or like-type. The thermal emission of these heater elements is controlled by an output signal from their respective control units 16–18 which is received over electrical conductors 24–26. Thus, any variation of the temperature of the fluid contained in tank 12, for example, will be detected by the heat detecting unit connected to conductor 20. The signal generated by this detected variation in temperature will energize the control unit 16 thereby resulting in an electrical signal being fed over conductor 24 to the tank's heating unit which in turn will increase or decrease the thermal emission of the heating unit, as the case may demand, to adjust the temperature in the tank to a predetermined value.

The output ports 28–30 of each tank 12–14 are connected through fluid conduits 32–34 to the inlet sides 36–38 of a mixer unit 40. A control valve 42–44 is included in each of the fluid conduits 32–34 for controlling the flow of fluid from the two tanks into the mixer unit 40. The operating condition, that is, the amount of fluid being passed by each valve 42–44 is controlled by a variable control unit 46. For purposes of illustration it may be assumed that the valves 42–44 are of the electrical solenoid type and are controlled by an electrical signal fed to them over electrical conductors 48–50. Thus when no fluid is to be fed to the mixing unit 40 the control valves 42–44 are closed, while each valve can be opened to any degree up to "full on" when fluid is being fed into the mixer unit 40. This arrangement permits various amounts of the fluids from tanks 12 and 14 to be continuously mixed together thereby forming a dispersion made up of any selected percentage of ingredients.

A source of drive power 52 such as an electrical motor is coupled through a drive shaft 54 to the mixer unit 40. Preferably this motor is of the variable speed type which is controlled by a control unit 56 through electrical leads 58. Since under normal operating conditions the motor 52 will not be running unless the fluid control valves 42–44 are open and the mixer unit 40 is receiving a flow of fluid, an electrical conductor 60 is connected between the valve control unit 46 and the motor speed control unit 56. Thus, whenever the speed control unit 56 is energized to start the motor 52 an electrical signal will be fed via lead 60 to simultaneously energize the valve control unit 46 thereby opening the valves 42–44 to their predetermined settings to give the desired emulsion. By this arrangement the mixer unit 40 will be placed in motion at the same time a source of fluid is effectively connected to its inlet ports 36–38 thereby assuring that the dispersion flowing from the mixer unit outlet port 62 is a properly mixed homogeneous emulsion. Furthermore, if the mixer unit 40 is of the meshed-gear pump type the emulsion can be produced in a continuous stream in a demand or "instantaneous" basis by the simple expedient of turning on the motor through the speed control unit 56. Since the outlet port 62 can be connected directly to any desired process, such as a continuous-mix dough producing system, this assures that the emulsion is "fresh" and in its most active state when it is added to the dough.

Figure 2:
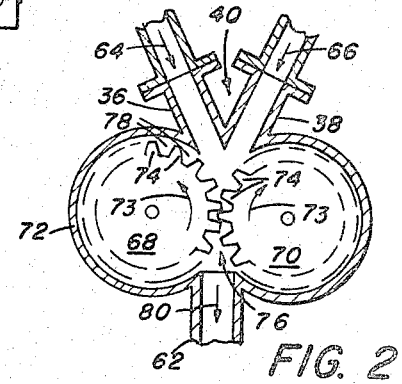
FIGURE 2 is a sectional view of a mixer unit that can be used for preparing the homogeneous glyceride emulsions.

FIGURE 2 illustrates in a somewhat pictorial manner how a mixer unit of the gear pump type will operate to give a continuous stream of homogeneous glyceride emulsion. In this instance the heated fluid from the tank 12, such as mono-diglyceride at 200° F., is flowing through the inlet port 36 into the mixer unit 40 as indicated by the arrowhead 64. The other heated fluid, such as water at 115° F., is being fed into the pump through inlet port 38 as indicated by the arrowhead 66. The two gear wheels 68–70 are rotating in opposite directions within the pump housing 72 as indicated by the arrowheads 73. The centers of rotation of the two gear wheels 68–70 are so positioned that the teeth 74 on the wheels mesh to form a substantially liquid tight interface. Ideally the clearance between the inner wall of the pump housing and the tip of the teeth of the gear wheels is such that no fluid will seep out once it has been picked up in the area 78 existing between the teeth. The fluids trapped in the area 78 will be carried into the mixing zone 76 where they will be subjected to a combination of forces which causes them to become mixed. As the now mixed fluids or emulsion continues to be moved forward by the rotating gear wheels it will be ejected from the pump at a high velocity through the outlet port 62 as indicated by the arrowhead 80. This high velocity expulsion of the emulsion further assures a complete blending or mixing together of the ingredients.

As will be apparent, the limited amount of fluids that can be carried in the areas 78 of the gear wheels 68–70 coupled with the small mixing area or zone 76 existing within the pump assures that a perfect mix will occur at all times. Even more importantly, this "incremental" mixing that occurs as the fluid carrying areas 78 pass into the mixing zone 76 assures that the temperature of the two fluids will be adjusted by their being mixed together so that a temperature within the critical range of from about 100° F. to 170° F. for distilled monoglycerides and about 130° F. to 170° F. for monodiglyceride will always exist. If such did not exist then no usable dispersion of monoglyceride or mono-diglyceride would be produced. Furthermore, the residence time of the liquids within the mixing zone is relatively short and the ingredients are applied directly to the food product as soon as they are mixed.

Thus the requirements placed upon the mixing unit 40 are that it must: (1) operate at such a speed that complete blending of the ingredients occurs; (2) mix such small portions of the ingredients at any instant of time that the temperature within the mixing area is maintained in the critical range; (3) deliver the required flow of the dispersion in a fresh state and under the necessary head of pressure as required by the process in which the system is operating; and (4) be capable of instantaneous starts and stops thereby permitting a "demand" type of operation. The pump type mixing unit 40 should also be capable of pumping a semi-solid material such as a gel without damage since under certain conditions the ingredients may be so heated as to produce such formations.

Figure 3:
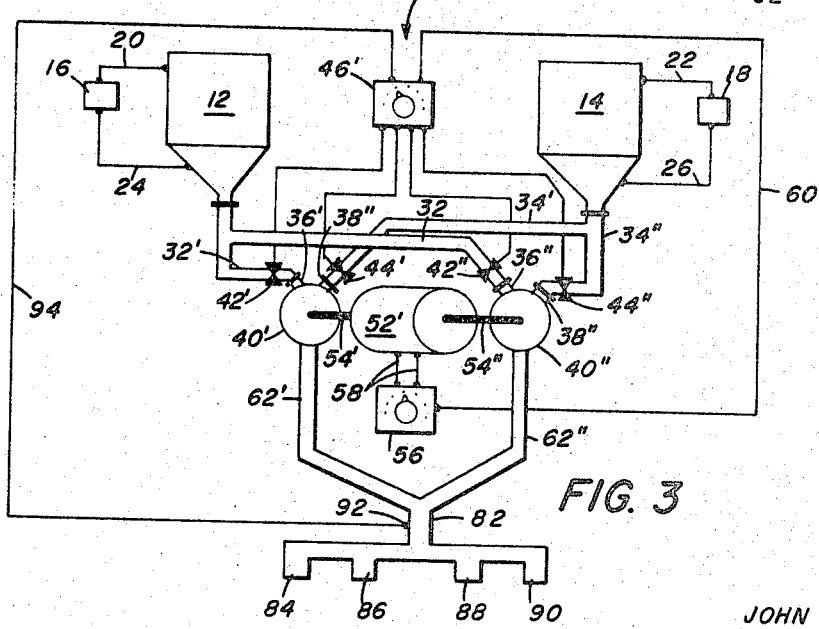
FIGURE 3 illustrates one preferred way in which the demand output capacity of this invention can be modified.

The amount of the dispersion that may be required from the mixing unit 40 can vary over rather wide ranges depending upon the type of process with which the system is being employed. However, it is not uncommon for certain continuous-mix dough making units to require as much as, for example, 30 gallons per minute or as little as 1 gallon or less per minute. If a single monodiglyceride mixing unit is to furnish several such units it is readily seen that the demand placed upon the unit may be excessive. Therefore, the basic mixing unit illustrated in FIGURE 1 may need to be expanded to provide a greater degree of flexibility of operation. FIGURE 3 illustrates one way in which this high-low flow rate capability can be provided in accordance with this invention.

As seen in FIGURE 3, the demand response, continuous emulsion feed system 10' has been expanded to include two mixer units 40'–40" which are driven by a double-ended power unit 52' via shafts 54'–54", respectively. The fluid tank or container 12 is connected to one of the inlet ports 36'–36" on each of the mixer units 40'–40" through fluid conduits 32'–32". A control valve 42'–42" is included in each of the fluid conduits 32'–32" for controlling the flow of fluid from the tank 12 into the mixer units. A similar arrangement of fluid conduits 34'–34" and control valves 44'–44" is employed for connecting the fluid tank 14 to the other inlet ports 38'–38" of the two mixer units 40'–40". The output ports 62'–62" of the mixer units 40'–40" are joined and fed into a single fluid conduit 82. The plurality of processes which use the emulsion being produced are fed from various fluid tap-off ports 84–90.

The valve control unit 46' is employed for controlling the on-off condition of the valves 42'–42" and 44'–44" as well as the degree to which they are opened. Since the emulsion feed system 10' is of the demand type, that is, it produces only that amount of emulsion that is necessary to fill the needs of the various processes at any given instant of time, the control unit 46' must be of the type which can be operated on a demand mode. To provide this flexibility of operation a pressure transducer 92, for example, is connected to the interior of fluid conduit 82. This transducer may be of the electrical type in which case an electrical connection 94 must be provided to the valve control unit 46'.

The operation of the demand response, continuous emulsion feed system 10' may be explained in the following manner:

To place the emulsion feed system 10' in operation the power source 52' is energized through the control unit 56 thereby causing the valve control system 46' to simultaneously open the desired number of the valves 42'–44' and 42"–44" by a predetermined degree. The ingredients from the tanks 12 and 14 that are fed through the fluid conduit lines and open valves into the mixer units 40'–40" are mixed and fed directly under force through the conduit line 82 and tap-off ports 84–90 to the processes in which the emulsion is to be used. As will be apparent, if a large demand for the emulsion exists at the moment the system is placed in operation, that is, if the tap-off ports 84–90 are all open and the emulsion is flowing through them with little or no back pressure, the pressure within the fluid conduit 82 as sensed by the pressure transducer 92 will be low. To compensate for this condition the control unit 46' will be actuated by the signal from the transducer and will open the valves 42'–44' and 42"–44" to thereby feed more of the ingredients into the mixer units 40'–40" until the pressure within the conduit is raised to a predetermined value. Once this pressure is reached the valves will be adjusted to maintain the emulsion head constant.

Should the demand for emulsion increase or decrease, as would occur if the process being fed by tap-off ports should be started or stopped, then the valve control system would again be energized through the signal from the transducer and the individual valves adjusted to give the desired pressure. For example, assuming that the tap-off ports 84–90 are connected to four independent continuous-mix systems that require ten gallons of emulsion per minute each at a pressure or head of 10 p.s.i. when they are operating, and that initially only two of the continuous-mix systems are in operation, the emulsion feed system 10' in this situation will be adjusted to feed twenty gallons of emulsion per minute at 10 p.s.i. Now if a third continuous-mix system is turned on, an additional demand of 10 gallons per minute of emulsion is made on the emulsion feed system 10'. This newly added demand for an additional 10 gallons per minute of emulsion results in a drop in pressure in the conduit 82 from 10 p.s.i. to, for example, 7 p.s.i. As a result, the pressure responsive transducer 92 will energize the valve control system 46' thereby further opening the valves 42'–44" until a sufficient quantity of ingredient are being fed through the mixer units 40'–40" to fulfill this new demand. Once this point is reached the pressure will be stabilized at 10 p.s.i. and the system will again be balanced.

A specific example of an embodiment of the mixer unit illustrated in FIGURE 1 is shown in FIGURE 5 and 6. It will be seen that a compact, semi-portable unit can be achieved resulting in obvious advantages. In this embodiment, two fluid containing tanks are disposed side-by-side in the upper portion of the unit. The carrier liquid, e.g. water, tank 14 may be smaller than the tank 12 containing the material to be mixed in the carrier liquid, e.g. the mono-diglyceride, providing space for the location of the mixer unit 40, i.e., the gear pump, and its driving motor 52. A variable control valve, 42 and 44, is provided in each tank outlet line, 32 and 34, leading to the mixer unit 40. As prevously noted, each tank is provided with a heater element, 31 and 33, to maintain the materials at the desired temperature. The water tank 14 may be provided with a float-type valve 35 to maintain the supply of carrier liquid from an outside source. The resulting emulsion may be discharged from the mixer unit through port 62 extending through the front panel of the unit. This front panel may also contain all of the control elements previously described, facilitating the operation of the mixer.

FIGURE 4 illustrates one type of continuous-mix system in which the demand response, continuous emulsion feed system of this invention can be used to good advantage. In the continuous-mix system of the type illustrated, which is the Amflow unit marketed by American Machine and Foundry Company, the initial ingredients (yeast, yeast food, water, and part of the sugar required) pass through three main physical stages on their way to becoming bread dough. First, substantially all of the yeast, water, yeast food and up to 60 percent of the flour to be used in producing the dough are homogeneously mixed in the blending tank by a marine-type propeller. This blend of material, which is called the "brew," is allowed to ferment for an hour. Secondly, salt, milk, and sugar are then added, and the "brew" now becomes a "liquid sponge." This liquid-sponge is put into the holding tank to ferment for another hour. Finally, from the holding tank the sponge is pumped to a horizontal liquid-sponge trough where additional sugar can be added, if desired, to make sure there is unfermented sugar in the final dough. Fermentation continues here for about an hour to obtain desired maturity.

The demand response, continuous emulsion feed system 100, which is constructed and operates substantially in the manner described in reference to FIGURE 1, is connected directly to the incorporator unit of the continuous-mix system. The liquid-sponge and other materials in a liquid stage, along with the balance of flour, are also metered automatically into the incorporator. Here they are mixed under pressure into a homogeneous mass called the "premix." The premix is then pumped under pressure into the developer where contra-rotating paddles develop it into a uniform, properly finished dough. The dough then passes into the divider-panner where it is accurately divided and panned.

Although the use of the demand response, continuous emulsion feed systems of this invention have been described in reference to the manner in which they are to be used with a continuous-mix dough system such as is used in producing bread, it is to be realized that such feed systems are equally adapted for numerous other uses. For example, the described methods and apparatus of mixing glyceride emulsions is especially important in the processing or production of macaroni, cereal, dehydrated potato, and foam-mat dried products as well as other industries which may find use for glyceride emulsions.

In those instances where a glyceride is to be added to macaroni, the automatic continuous feed system of this invention is connected into the macaroni plant so that the glyceride emulsion joins the flow of semolina and water passing through the mixer to form the dough. In a similar manner, cereal processors desiring to use the aqueous emulsified form of glyceride can add it continuously to their process by either feeding it to the syrup (if used), adding it to the grain (dough) mixer, or contacting the dough with emulsion prior to or after cooking.

In both the flake and granule processes of preparing dehydrated potatoes the only "batch" process heretofore involved in the sequence of events has been the preparation of tanks of glyceride emulsions. Thus the use of the process and apparatus of this invention enables a potato processor to eliminate this "batch" step by continuously preparing and adding glyceride emulsions at any desired concentration to the process on a demand basis. This demand system also permits the processor to quickly change the concentration and addition levels when necessary or desirable. Furthermore, since the "instant" dispersion can be added to the potatoes while it is still warm, the use of this demand system permits a higher concentration of glycerides to be used than was heretofore throught possible. This use of a high percentage of glyceride with very little water added thereto is in sharp contrast to batch preparations which must have a low-glyceride-high water concentration in order to remain fluid.

It should be understood that although the process and apparatus of this invention have been disclosed at length as to their use in forming homogeneous mono-diglyceride emulsions, this invention is equally adapted for forming other emulsions from a fat or oil. For example, an emulsion of distilled monoglycerides can be prepared in the above described manner by blending the monoglycerides with water such that the final emulsion as blended is at a temperature between about 100° F. and about 170° F. If the resulting temperature is higher than about 170° F. a gel of distilled monoglyceride will be formed which is more difficult to use, but which nevertheless, under controlled conditions, will produce satisfactory bread. When the temperature is lower than about 100° F. the distilled monoglyceride may not be completely hydrated.

By way of example, melted Myverol type 18–07 distilled monoglycerides (produced from hydrogenated cottonseed oil) was mixed in a system of the type illustrated in FIGURE 1. The temperature of the distilled monoglycerides was varied over the range of from about 180° F. to about 210° F. while the temperature of the water was varied from about 90° F. to about 145° F., care being taken to always maintain the resulting temperature of the mix within the specified critical range of from about 100° F. to about 170° F. The emulsion pumped from the outlet side of the pump-mixer was also varied from 20 gallons per hour to 180 gallons per hour. In all instances a very smooth, even fluid mix was obtained.

The above experiment was repeated using Myverol type 18–00 (distilled glycerol monostearate prepared from hydrogenated lard monoglyceride). The same smooth fluid mix was obtained as before.

To determine more accurately the concentrations of distilled monoglycerides that could be mixed to give a usable product using the method and apparatus of this invention, the water in the tank of a system similar to that illustrated in FIGURE 1 was maintained at 140° F. Melted Myverol type 18–06 (distilled glycerol monostearate prepared from hydrogenated soybean oil) was held in the other tank at 200° F. The total flow rate from the pump-mixer was adjusted to about 20 gallons per hour. The openings of the control valves were then varied to give the following percentages of distilled monoglyceride-to-water with the indicated results:

| Composition: | Remarks |
|---|---|
| 2% monoglyceride—98% water | Very fluid. |
| 3% monoglyceride—97% water | Do. |
| 15% monoglyceride—85% water | Fluid. |
| 22% monoglyceride—78% water | Slightly viscous fluid. |
| 36% monoglyceride—63% water | Viscous cream. |
| 39% monoglyceride—61% water | Smooth paste. |
| 62% monoglyceride—38% water | Monoglyceride gel extruded in a solid stream. |

The emulsions produced in all of the examples herein were suitable for use in starch-complexing applications in macaroni products, cereal, bread dough and dehydrated potatoes.

A hydrate was continuously produced containing 25 percent Myverol type 18–00 which was prepared by melting the Myverol type 18–00 and holding it at 180° F., and 75 percent water heated to 145° F. The emulseion or hydrate was metered from the mixing unit to a dough mixer containing enough dough to give an additional level of 5 ozs. of hydrate/100 lbs. of flour. The dough was prepared from 100 parts, by weight, Minnesota Mellow Flour (11.3 percent protein), 3 parts shortening, 69 parts water, 2 parts yeast, and 0.5 part yeast food, 6 parts sugar, 4 parts milk powder, and 2.25 parts salt. The dough was dry, and after proofing and baking the bread scored 95 based on the American Institute of Baking Scoring System and had a softness number of 73.

A demand response, continuous emulsion feed system substantially as illustrated in FIGURE 1 was used with Myverol type 18–00 and water to continuously produce a glyceride gel. For this purpose the Myverol type 18–00 was heated and held at 230° F. and the water was heated to 160° F. When these were combined continuously, a gel was extruded from the apparatus containing 59 percent Myverol type 18–00 and 41 percent water. The gel was metered to a dough mixer containing dough to give an addition level of 2.2 ozs. of gel/100 lbs. of flour. The dough was prepared from Minnesota Mellow Flour as in the example above. The dough was dry and, after proofing and baking, the bread scored 94 and had a softness number of 74.

Although certain preferred embodiments of the invention have been specifically illustrated, it is realized that numerous modifications of the process and apparatus are possible. For example, the valves used to control the flow of ingredients into and away from the mixer unit can be of several different types such as manual valves, for example. It is also possible to feed other ingredients into the mixer unit along with the glycerides and liquid carrier medium as long as the final emulsion temperature in the mixer unit remains in the critical range. Obviously other mixer units besides the gear pump unit illustrated can be used as long as they produce the desired homogeneous product and can be operated on a demand basis. Other heaters besides, or in addition to, the ones shown may also be used. In certain instances it may also be desirable, for example, to heat the fluid conduits and/or mixer unit. The control units for the complete system can also be varied as, for example, by including a timer unit in the system for automatically feeding the emulsion to a process at designated intervals of time.

However, in any modification of the process or apparatus of this invention, it must be remembered that the ingredients being mixed with the glycerides must be a such tempertures that the final emulsion temperature is in the critical range. If the resulting temperature is higher than 170° F. with distilled monoglyceride or mono-diglyceride per se, a gel will result which is normally undesirable for these applications. When the temperature is lower than 100° F. for the monoglyceride, or 130° F. for the mono-diglyceride, they may not be completely hydrated.

From the above description and examples it will be readily apparent that the process and apparatus of this invention offers numerous advantages over any other like process or apparatus heretofore available to the industry. For example, the method and apparatus of this invention differ from, and are thus advantageous over, conventional procedures in that they provide a simple, inexpensive, highly flexible, and compact system whereby various amounts and concentrations of active monoglyceride or mono-diglyceride emulsions can be produced upon demand at the location where they are to be used. This completely eliminates the conventional "batch" type mixing procedures heretofore thought necessary thus permitting a food processor to purchase a concentrated glyceride which can then be transformed into a hydrate as needed. Obviously, not only does this alleviate the shipping, storage and handling problems that heretofore plagued the industry, but also rendered obsolete the use of large heating, stirring and cooling tanks required where multiple batch mixing of emulsions is involved.

The ability of this novel system to prepare and add the emulsions directly to the food product as they are needed also assures the processor of the most active emulsion possible, and eliminates plating out, foaming or like problems heretofore encountered where pre-mixed batches of emulsion were used. Therefore, this invention eliminates the need for expensive and complicated homogenizing equipment while at the same time increasing the flexibility and versatility of the processors production facilities.

Moreover, while the application of the present invention has been primarily directed to the food industry, it will be appreciated that it may be employed for making many dispersions for non-food industries. For example, water dispersions of certain types of waxes are now made in batch processes for use as textile coatings, floor polishes, insecticide sprays or paper coatings. Because of the high melting point of some of the waxes used, it has been necessary to utilize a high water temperature. It has also sometimes been necessary to utilize a pressure vessel, in which the blending takes place. Moreover, with such batch blending processes, it has been found that the length of time necessary to melt the wax has resulted in undesirable discoloration in the final product. By using an embodiment of the present invention, it has been possible to continuously make water dispersions of these waxes without the high temperatures, pressure vessels, or extended lengths of time previously necessary, resulting in greater production continuously of higher quality products.

For example, a water dispersion of a polyethylene wax, Epolene Wax type E–10, was prepared by melting 10 kg. of the wax with 1.5 kg. of the tall oil fatty acids (Actintol type FA–3) and adding 1.5 kg. of morpholine thereto in the dispersion material tank of the present invention. The mixture was maintained at a temperature of 275° F. Water was maintained in the carrier liquid tank at a temperature of 190° F. A dispersion containing approximately 25% wax was produced at a rate of about 10 gallons per hour by feeding the foregoing materials to the mixing pump of the present invention. When the water temperature was reduced to 135° F., a dispersion containing 35% wax was obtained at a rate of approximately 40 gallons per hour.

As a result, by the instantaneous continuous mixing of small increments of the wax material in water, a wax dispersion can be obtained without the necessity of storing the molten wax with the resultant color deterioration. Moreover, the necessity of large storage tanks and pressure vessels is eliminated with the attendant expenses associated therewith.

From the foregoing description it can be seen that there have been provided a novel method and apparatus which are exceptionally efficient for continuously preparing stable dispersions of of a material in a liquid where they are normally immiscible or insoluble. The invention is particularly advantageous for dispersing in water such normally immiscible materials as natural fats and oils and their derivatives, and natural or synthetic waxes, including, but not limited to, the various glycerides, cottonseed oil, polyethylene waxes, carnauba wax, and beeswax.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for preparing active glyceride-liquid dispersions comprising supply means for furnishing a glyceride to be used in forming the dispersion; supply means for furnishing a liquid carrier to be used in forming the dispersion; mixer means for receiving and mixing together predetermined quantities of said glyceride and said liquid carrier from said supply means; means for variably regulating the ratio of the glyceride and the carrier liquid supplied to said mixer means from said supply means; heater means connected to said glyceride supply for maintaining the glyceride being furnished to said mixer means at a temperature between the glyceride melting point and the glyceride decomposition point; heater means connected to said liquid carrier supply means; and heater regulator means responsive to the temperature of the glyceride and the variable regulating means arranged to acuate said liquid carrier heater means to regulate the temperature of the liquid carrier so that the temperature of the final dispersion produced, as the glyceride and liquid carrier are mixed together in said mixer means, is between 100° F. and 170° F.

2. An apparatus according to claim 1 wherein the output from said mixer means is connected directly to a food processing system so that the dispersion is fed substantially directly into said system as it is produced.

3. An apparatus according to claim 2 wherein a demand responsive control means is operatively connected to said mixer means so that the final dispersion is produced on a demand basis as it is being used in said food processing system.

4. An apparatus according to claim 1 wherein said mixer means is a gear pump mixing unit.

5. An apparatus according to claim 1 wherein said mixer means consists of at least a first and second mixing unit, said first mixing unit being adapted to supply a relatively low quantity of emulsion or dispersion at a constant flow rate while said second mixing unit is adapted to supply a relatively large quantity of emulsion or dispersion at a constant flow rate.

6. Apparatus for continuously preparing a stable, uniform dispersion comprising supply means for furnishing a liquid carrier to be used in forming the dispersion, supply means for furnishing the material to be dispersed in the liquid carrier, mixing means for receiving and mixing together said material and said carrier, said mixing means comprising a pair of meshing gear members arranged within a mixing chamber, said gear members having a small peripheral clearance with the wall of the mixing chamber, said liquid carrier supply means and said dispersion material supply means arranged to introduce said liquid carrier and said dispersion material tangentially of said gear members directly into the disengaging area of mesh of said gear members, means for rotating said gear members in a direction to carry incremental portions of said liquid carrier and said dispersion material peripherally around each gear away from the area of mesh and to combine said incremental portions in the engaging area of mesh, and heater means associated with said material supply means to maintain said material in a molten state.

7. Apparatus for continuously preparing dispersions of a molten-material in liquid carrier comprising a first supply tank for holding and furnishing the molten material to be used in forming the dispersion, a second supply tank disposed adjacent said first tank for furnishing the liquid carrier to be used in forming the dispersion, mixer means disposed beneath said second supply tank for receiving and mixing together predetermined quantities of said molten material and said liquid carrier from said first and second supply tanks, said mixing means comprising a pair of meshing gear members arranged within a mixing chamber, said gear members having a small peripheral clearance with the wall of the mixing chamber, said liquid carrier supply tank and said molten material supply tank arranged to introduce said liquid carrier and said dispersion material tangentially of said gear members directly into the area of mesh of said gear members, means for rotating said gear members in a direction to carry incremental portions of said liquid carrier and said molten material peripherally around each gear away from the area of mesh and to combine said incremental portions in a second area of mesh opposite to said first area of mesh, heater means disposed in said molten material supply tank for maintaining the material being furnisehd to said mixer means at a temperature between the material melting point and the material decomposition point, heater means disposed in said liquid carried supply tank for maintaining the temperature of the liquid carrier at a predetermined temperature, and a control valve disposed in each tank to regulate the flow of both said molten material and said liquid carrier to said mixer means.

8. A process of continuously preparing a dispersion of a liquid carrier and a material which is immiscible therewith utilizing a mixing apparatus comprising a mixing chamber having a pair of meshing gear members arranged therein with small peripheral clearance between the gears and the wall of the chamber, the process comprising the steps of supplying to said mixing chamber said carrier liquid and said second material in separate flowing streams tangentially of said gear members directly into a first area of mesh of said gear members, rotating said gears in a direction such that said gears carry first and second mixtures of said carrier liquid and said second material peripherally around each gear away from the first area of mesh, combining the first and second mixtures on a second side of said area of mesh opposite to said first side, and discharging a stream of the combined mixtures from said mixing chamber as a dispersion.

9. A process according to claim 8 including the steps of heating said carrier liquid to a predetermined temperature and the second material to a temperature above its melting point before supplying said materials to said mixing chamber.

References Cited

UNITED STATES PATENTS

| | | | |
|---|---|---|---|
| 2,958,516 | 11/1960 | Wall | 259—8 |
| 3,179,382 | 4/1965 | Knedlik | 259—95 |
| 3,265,365 | 8/1966 | Ward | 259—8 |
| 3,397,868 | 8/1968 | Schlernitzauer | 259—8 |

ROBERT W. JENKINS, Primary Examiner